(12) United States Patent
Chopko et al.

(10) Patent No.: US 11,318,807 B2
(45) Date of Patent: May 3, 2022

(54) TRANSPORT REFRIGERATION UNIT

(71) Applicant: Carrier Corporation, Palm Beach Gardens, FL (US)

(72) Inventors: Robert A. Chopko, Baldwinsville, NY (US); Garrison S. Moseley, Liverpool, NY (US); Ciara Poolman, Syracuse, NY (US); Craig Drew Bogli, Avon, CT (US); Ivan Rydkin, Rochester, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 262 days.

(21) Appl. No.: 16/620,416

(22) PCT Filed: Jun. 7, 2018

(86) PCT No.: PCT/US2018/036374
§ 371 (c)(1),
(2) Date: Dec. 6, 2019

(87) PCT Pub. No.: WO2018/226906
PCT Pub. Date: Dec. 13, 2018

(65) Prior Publication Data
US 2021/0078387 A1    Mar. 18, 2021

Related U.S. Application Data

(60) Provisional application No. 62/516,539, filed on Jun. 7, 2017.

(51) Int. Cl.
*B60H 1/00*    (2006.01)
*B60H 1/32*    (2006.01)
*B60P 3/20*    (2006.01)

(52) U.S. Cl.
CPC ....... *B60H 1/00014* (2013.01); *B60H 1/3229* (2013.01); *B60H 1/3232* (2013.01); *B60P 3/20* (2013.01)

(58) Field of Classification Search
CPC .............. B60H 1/00014; B60H 1/3232; B60H 1/3229; B60P 3/20; F25D 19/003; B60K 1/04; B60K 2001/0444; B60L 50/64
See application file for complete search history.

(56) References Cited

U.S. PATENT DOCUMENTS 1,551,594 A * 9/1925 Walter ..................... B60K 1/04
180/65.1
1,678,033 A * 7/1928 Brumbaugh .......... H01M 50/20
180/68.5

(Continued)

FOREIGN PATENT DOCUMENTS

DE    29613222 U1    9/1996
EP    2019274 A1    1/2009

OTHER PUBLICATIONS

Written Opinion for International Application No. PCT/US2018/036374, International Filing Date Jun. 7, 2018, dated Sep. 26, 2018, 8 pages.

(Continued)

*Primary Examiner* — Christopher R Zerphey
(74) *Attorney, Agent, or Firm* — Cantor Colburn LLP

(57) ABSTRACT

A transport refrigeration unit includes at least one component, a frame (136), and an energy storage module (110). The at least one component is driven by electrical power. The frame (136) is constructed and arranged to structurally support the plurality of components. The energy storage module (110) is adapted to provide the electrical power, and is internally located and supported by the frame (136).

11 Claims, 5 Drawing Sheets

(56) References Cited

U.S. PATENT DOCUMENTS

| | | | | |
|---|---|---|---|---|
| 3,759,244 | A * | 9/1973 | Konet | F24H 3/065 |
| | | | | 126/11 OR |
| 3,871,188 | A * | 3/1975 | Vold | F25D 19/003 |
| | | | | 62/298 |
| 5,501,289 | A * | 3/1996 | Nishikawa | H01M 50/20 |
| | | | | 180/68.5 |
| 5,833,023 | A * | 11/1998 | Shimizu | B62D 21/10 |
| | | | | 180/68.5 |
| 6,257,013 | B1 * | 7/2001 | Murray | B60H 1/3229 |
| | | | | 62/302 |
| 6,837,325 | B2 * | 1/2005 | Shimizu | B60L 50/66 |
| | | | | 180/68.5 |
| 6,931,884 | B2 * | 8/2005 | Kolda | B60H 1/3232 |
| | | | | 62/239 |
| 8,033,521 | B2 * | 10/2011 | Khan | B60H 1/3232 |
| | | | | 248/672 |
| 8,295,950 | B1 * | 10/2012 | Wordsworth | B60L 1/003 |
| | | | | 700/22 |
| 8,701,430 | B2 * | 4/2014 | Kitano | B60H 1/3226 |
| | | | | 62/239 |
| 9,134,058 | B2 * | 9/2015 | Ikemiya | F25B 47/022 |
| 2007/0251685 | A1 | 11/2007 | Viegas | |
| 2010/0045105 | A1 * | 2/2010 | Bovio | B60H 1/00428 |
| | | | | 307/9.1 |
| 2013/0206496 | A1 * | 8/2013 | Hashimoto | B62D 27/023 |
| | | | | 180/291 |
| 2015/0246593 | A1 * | 9/2015 | Larson | B60H 1/00764 |
| | | | | 62/56 |

OTHER PUBLICATIONS

International Search Report for International Application No. PCT/US2018/036374, International Filing Date Jun. 7, 2018, dated Sep. 26, 2018, 6 pages.

* cited by examiner

TRANSPORT REFRIGERATION UNIT

CROSS-REFERENCE TO RELATED APPLICATIONS

This is a National Stage Application of PCT/US2018/036374 filed Jun. 7, 2018, which claims priority to U.S. Provisional Application No. 62/516,539 filed Jun. 7, 2017, both of which are incorporated herein by reference in their entirety.

BACKGROUND

The present disclosure relates to a transport refrigeration unit and, more particularly, to the support and physical distribution of an energy storage module of the transport refrigeration unit.

Traditional refrigerated cargo trucks or refrigerated tractor trailers, such as those utilized to transport cargo via sea, rail, or road, is a truck, trailer or cargo container, generally defining a cargo compartment, and modified to include a refrigeration system located at one end of the truck, trailer, or cargo container. Refrigeration systems typically include a compressor, a condenser, an expansion valve, and an evaporator serially connected by refrigerant lines in a closed refrigerant circuit in accord with known refrigerant vapor compression cycles. A power unit, such as a combustion engine, drives the compressor of the refrigeration unit, and may be diesel powered, natural gas powered, or other type of engine. In many tractor trailer transport refrigeration units, the compressor is driven by the engine shaft either through a belt drive or by a mechanical shaft-to-shaft link. In other systems, the engine of the refrigeration unit drives a generator that generates electrical power, which in-turn drives the compressor.

More current refrigeration systems may utilize energy storage devices, or batteries, to replace or supplement the power provided by the combustion engine and/or generator. Placement of the energy storage devices and packaging of the overall refrigeration system remains a challenge.

BRIEF DESCRIPTION

A transport refrigeration unit according to one, non-limiting, embodiment of the present disclosure includes at least one component driven by electrical power; a frame constructed and arranged to structurally support the plurality of components; and an energy storage module adapted to provide the electrical power, and internally located and supported by the frame.

Additionally to the foregoing embodiment, the frame is tubular.

In the alternative or additionally thereto, in the foregoing embodiment, the transport refrigeration unit includes an electrical bus electrically connected between the at least one component and the energy storage module, wherein the electrical bus is substantially located inside the frame.

In the alternative or additionally thereto, in the foregoing embodiment, the electrical bus includes a plurality of power conductors.

In the alternative or additionally thereto, in the foregoing embodiment, the electrical bus includes a plurality of control conductors.

In the alternative or additionally thereto, in the foregoing embodiment, the energy storage module is at least one battery.

In the alternative or additionally thereto, in the foregoing embodiment, the frame includes a tube extending along a centerline, the tube including an outer surface facing radially outward and an inner surface facing radially inward, and wherein the inner surface defines a cavity and the energy storage module is disposed in the cavity.

In the alternative or additionally thereto, in the foregoing embodiment, the at least one component includes a compressor.

In the alternative or additionally thereto, in the foregoing embodiment, the at least one component includes at least one fan motor.

In the alternative or additionally thereto, in the foregoing embodiment, the frame includes a first tubular member proximate to a first component of the at least one component and a second tubular member proximate to a second component of the at least one component, and wherein the energy storage module includes a first battery located in the first tubular member and configured to drive the first component and a second battery located in the second tubular member and configured to drive the second component.

In the alternative or additionally thereto, in the foregoing embodiment, the first component is a compressor and the second component is a fan motor.

In the alternative or additionally thereto, in the foregoing embodiment, the transport refrigeration unit includes an electrical bus electrically connected between the first and second batteries, and disposed in the frame.

In the alternative or additionally thereto, in the foregoing embodiment, the frame includes a third tubular member, the first, second and third tubular members each defining respective first, second and third cavities, and the third cavity extends between and is in communication with the first and second cavities, and wherein the first battery is located in the first cavity, the second battery is located in the second cavity, and the electrical bus is at least in-part located in the third cavity.

A refrigeration system according to another, non-limiting, embodiment includes a compressor driven by electrical energy; a frame including a structural tray constructed and arranged to in-part support the compressor; an energy storage module configured to provide the electrical energy to drive the compressor includes a structural encasement and a plurality of batteries, wherein the structural encasement is detachably connected to the structural tray and is constructed and arranged to support the plurality of batteries and in-part support the compressor.

Additionally to the foregoing embodiment, the compressor is located above the structural tray.

In the alternative or additionally thereto, in the foregoing embodiment, the compressor is attached to the structural tray.

In the alternative or additionally thereto, in the foregoing embodiment, the structural encasement is located below the structural tray.

In the alternative or additionally thereto, in the foregoing embodiment, the plurality of batteries are located between the structural tray and the structural encasement.

In the alternative or additionally thereto, in the foregoing embodiment, the refrigeration system includes a compound member including the structural tray and the structural encasement.

The foregoing features and elements may be combined in various combinations without exclusivity, unless expressly indicated otherwise. These features and elements as well as the operation thereof will become more apparent in light of the following description and the accompanying drawings.

However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
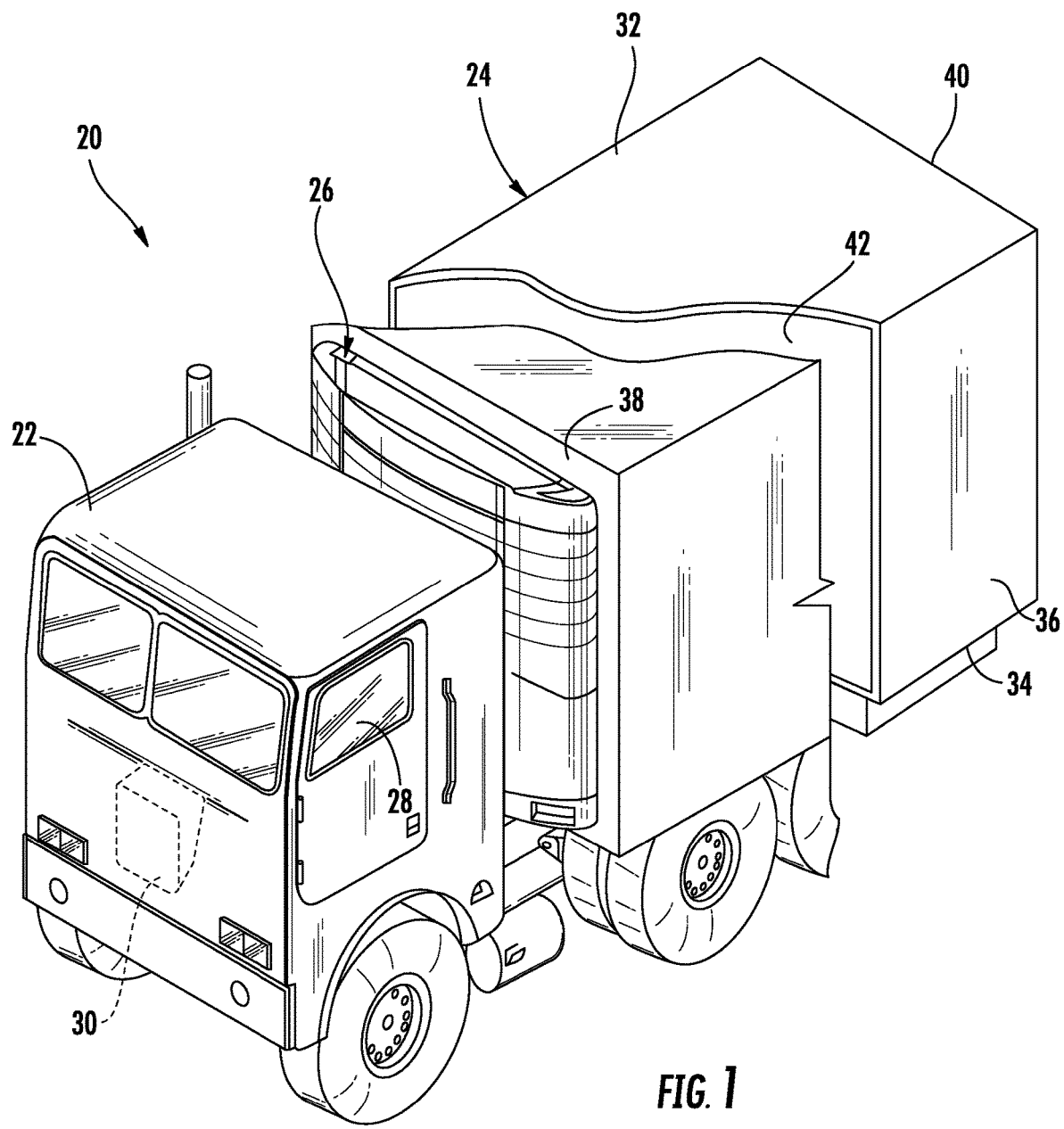
FIG. 1 is a perspective view of a tractor trailer system having a transport refrigeration unit as one, non-limiting, embodiment of the present disclosure.

Referring to FIG. 1, a tractor trailer system 20 of the present disclosure is illustrated. The tractor trailer system 20 may include a tractor or truck 22, a trailer 24 and a transport refrigeration unit (TRU) 26. The tractor 22 may include an operator's compartment or cab 28 and a combustion engine 30 as part of the powertrain or drive system of the tractor 22. The trailer 24 may be coupled to the tractor 22 and is thus pulled or propelled to desired destinations. The trailer 24 may include a top wall 32, a bottom wall 34 opposed to and space from the top wall 32, two side walls 36 spaced from and opposed to one-another, and opposing front and rear walls 38, 40 with the front wall 38 being closest to the tractor 22. The trailer 24 may further include doors (not shown) at the rear wall 40, or any other wall. The walls 32, 34, 36, 38, 40 together define the boundaries of a cargo compartment 42. It is further contemplated and understood that the cargo compartment 42 may also be divided into two or more smaller compartments for different cargo temperature requirements.

Figure 2:
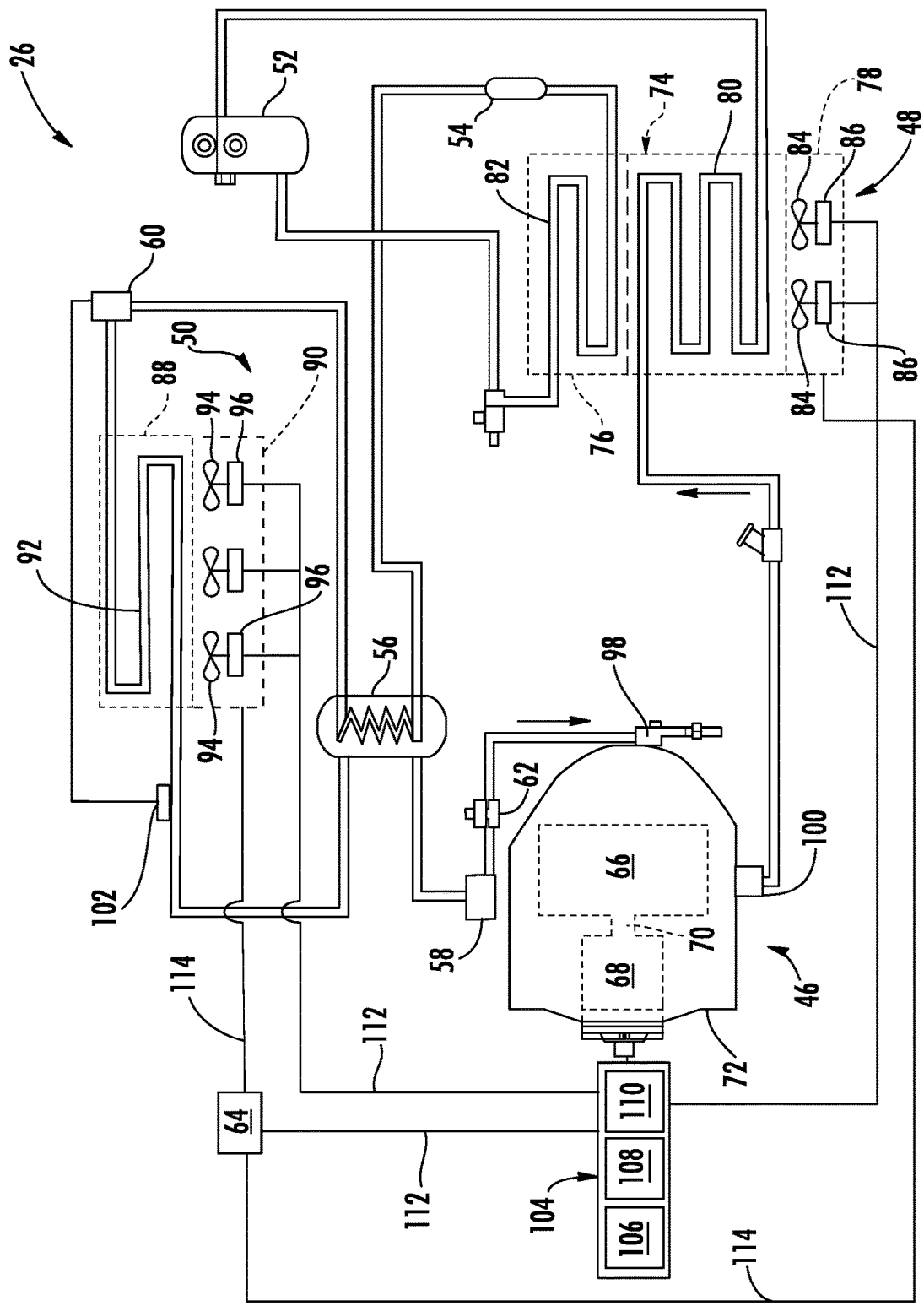
FIG. 2 is a schematic of the transport refrigeration unit.

Referring to FIGS. 1 and 2, the trailer 24 is generally constructed to store a cargo (not shown) in the compartment 42. The cargo is maintained at a desired temperature by cooling of the compartment 42 via the TRU 26 that circulates airflow into and through the cargo compartment 42 of the trailer 24. It is further contemplated and understood that the transport refrigeration unit 26 may be applied to any transport container, and not necessarily those used in tractor trailer systems. Furthermore, the transport container may be a part of the trailer 24 and constructed to be removed from a framework and wheels (not shown) of the trailer 24 for alternative shipping means (e.g., marine, rail, flight, and others).

The TRU 26 may be generally integrated into the trailer 24, and may be mounted to the front wall 38. Components of the TRU 26 may include a compressor assembly 46, a condenser assembly 48, an evaporator assembly 50, a receiver 52, a filter dryer 54, a refrigerant-to-refrigerant heat exchanger 56, an accumulator 58, a thermostatic expansion valve 60, a suction modulation valve 62, and a controller 64. The controller 64 may be locally located with the TRU 26, and may include a computer-based processor (e.g., microprocessor) and an electronic storage medium that may be computer readable and writeable. The compressor assembly 46 may include a compressor 66 and an electric compressor motor 68 for driving the compressor. The compressor 66 may also be driven by alternative means.

Referring to FIG. 2, the compressor 66 and the compressor motor 68 may be linked via an interconnecting drive shaft 70. The compressor 66, the compressor motor 68 and the drive shaft 70 may be sealed within a common housing 72. In some embodiments, the compressor motor 68 may be positioned outside of the compressor housing 72, with the interconnecting drive shaft 70 passing through a shaft seal (not shown) supported by the compressor housing 72. The compressor 66 may be a single compressor. The single compressor may be a two-stage compressor, a scroll-type compressor or other type of compressor adapted to compress refrigerants. This would include natural refrigerants such as $CO_2$, propane, ammonia, or any other natural refrigerant that may include a global-warming potential (GWP) of about one (1).

The condenser assembly 48 may include a condenser heat exchanger/gas cooler 74, a subcooler heat exchanger 76, and a condenser fan assembly 78 for flowing air through the heat exchangers 74, 76. The heat exchangers 74, 76 may include respective tubes 80, 82. The fan assembly 78 may include at least one fan 84 and at least one electric fan motor 86 for driving the at least one fan 84 (i.e., two illustrated) that induces the flow of air about the tubes 80, 82 of the respective heat exchangers 74, 76. It is contemplated that alternative means, other than the condenser fan assembly 78, may be applied to induce the flow of air through the condenser heat exchangers 74, 76. It is further contemplated that alternative means, other than the use of the electric fan motor 86, may be applied to drive the condenser fan 84.

The evaporator assembly 50 may include an evaporator heat exchanger 88 and an evaporator fan assembly 90 for flowing air through the heat exchanger 88. The heat exchanger 88 may include tube(s) 92. The fan assembly 90 may include at least one fan 94 (i.e., three illustrated) and at least one electric fan motor 96 for driving the at least one fan 94 that supplies a flow of air about the tubes 92 of the heat exchanger 88. It is contemplated that alternative means, other than the evaporator fan assembly 90, may be applied to induce the flow of air through the evaporator heat exchanger 88. It is further contemplated that alternative means, other than the use of the electric fan motor 96, may be applied to drive the evaporator fan 94.

In one embodiment of the operation of the TRU 44, it may be best understood by starting at the compressor 66 of the compressor assembly 46, where the suction gas (e.g., natural refrigerant) enters the compressor 66 at a suction port 98 and is compressed to a higher temperature and pressure. The refrigerant gas is emitted from the compressor 66 at an outlet port 100, and may then flow into the tube(s) 80 of the condenser heat exchanger 74.

Air flowing across a plurality of condenser coil fins (not shown) and the tubes 80, cools the gas to a saturation temperature. The air flow across the condenser heat exchanger 74 is facilitated by the condenser fan assembly 48. By removing latent heat, the gas within the tubes 80 condenses to a high temperature liquid at a high pressure, and flows to the receiver 52 that provides storage for excess liquid refrigerant during low temperature operation. From the receiver 52, the liquid refrigerant may pass through the subcooler heat exchanger 76 of the condenser assembly 48, through the filter-dryer 54 that keeps the refrigerant clean and dry, then to the refrigerant-to-refrigerant heat exchanger 56 that increases the refrigerant subcooling, and finally to the thermostatic expansion valve 60.

As the liquid refrigerant passes through the orifices of the expansion valve 60, some of the liquid vaporizes into a gas (i.e., flash gas). Return air from the refrigerated space (i.e., cargo compartment 42) flows over the heat transfer surfaces of the tubes 92 and fins (not shown) of the evaporator heat exchanger 88. As the refrigerant flows through the tubes 92, the remaining liquid refrigerant absorbs heat from the return air, and in so doing, the remaining liquid refrigerant is vaporized. The air flow across the evaporator heat exchanger 88 is facilitated by the evaporator fan assembly 90. From the tube(s) 92 of the evaporator heat exchanger 88, the refrigerant, in vapor form, may then flow through the refrigerant-to-refrigerant heat exchanger 56, and then to the accumulator 58 that may be used to prevent the entry of any liquid refrigerant into the compressor 66. The refrigerant, in vapor form, may be drawn from an upper part of the suction accumulator 58, through the suction modulation valve 62, and back to the compressor 66.

A thermostatic expansion valve bulb sensor 102 may be located proximate to an outlet of the evaporator tube 92. The bulb sensor 102 is intended to control the thermostatic expansion valve 60, thereby controlling refrigerant superheat at the outlet of the evaporator tube 92. It is further contemplated and understood that the above generally describes a single stage vapor compression system that may be used for many different refrigerants including natural refrigerants such as propane and ammonia. Other refrigerant systems may also be applied that use carbon dioxide ($CO_2$) refrigerant, and that may be a two-stage vapor compression system.

The TRU 26 further includes an energy source 104 configured to selectively power (i.e., directly or indirectly) multiple components of the TRU 26. The energy source 104 may include a combustion engine 106 (e.g., diesel engine), a generator 108, and an energy storage module 110. In operation, the combustion engine 106 may mechanically drive the compressor 66 directly and/or may mechanically drive the generator 108, which may provide the electrical energy to electrically drive the compressor motor 68 and/or electrically charge the energy storage module 110. In one example, the energy storage module 110 may be at least one bank of batteries. It is further contemplated and understood that other examples of the energy storage module 110 may include fuel cells, and other devices capable of storing and outputting electric power.

In one embodiment, the energy storage module 110 of the energy source 104 may power the compressor motor 68, the condenser fan motors 86, the evaporator fan motors 96, the controller 64, a starter (not shown) of the combustion engine 106, and other refrigeration components that may include various solenoids and/or sensors. The electrical power needed to power or drive the various refrigeration components may be transferred over various buses, electrical devices and/or electrical power conductors 112.

Power management relative to the energy source 104 and controlled power distribution relative to the various power loads (i.e., components) may be configured to minimize the size of the combustion engine 106 and minimize fossil fuel consumption while still providing enough electric power to meet temperature pulldown demands of the operating TRU 26. The controller 64 through a series of data and command signals over various control conductors 114 (i.e., electrical conductors or wires) may, for example, control the electric motors 68, 86, 96 and other components as dictated by the cooling needs of the TRU 26. The controller 64 may further control the electric power output of the generator 108 and the batteries 110 in order to meet the varying load demands of TRU 26.

In one example, the generator 108 and the energy storage module 110 may be electrically arranged in series. The electric power may be generally distributed through the power conductors 112, and may be direct current (DC). A converter (not shown) may be arranged at the outlet of the generator 108. The fan motors 86, 96 may be DC or alternating current (AC) motors, and the compressor motor 68 may be a DC motor, or AC motor with an inverter (not shown) at the power input to the motor 68. In one example, the generator 108 may have a maximum power output of about 15 kW, the energy storage module 110 may output electric power at about 10 kW, the compressor motor 68 load may be about 10 kW at steady state, and the evaporator fan motors 96 and condenser fan motors 86 load may be about 2 kW. It is further contemplated and understood that various power conditioning devices may be configured throughout the TRU 26 depending upon the current type and voltage demands of any particular component.

In one embodiment, the generator 108 may be configured or downsized to provide substantially all of the electric power demands of the TRU 26 including the motors 68, 86, 96 during standard set point conditions (i.e., steady state conditions). However, when the TRU 26 is operating in a temperature pulldown state, the energy storage module 110 may be available as a 'battery boost' to increase or supplement the DC power thereby satisfying the temporary increase in power demand of, for example, the compressor motor 68. In this embodiment, the voltage potential of the energy storage module 110 may be about 5 kW to 7 kW.

In another embodiment, the energy storage module 110 may be configured to provide substantially all of the electric power demands of TRU 26 including the motors 68, 86, 96 during standard set point conditions (i.e., steady state conditions). However, when the TRU 26 is operating in a temperature pulldown state, the generator 108 may be available as a 'battery boost' to increase or supplement the DC power, thereby satisfying the temporary increase or surge in power demand of, for example, the compressor motor 68. In this embodiment, the voltage potential of the energy storage module 110 may be about 15 kW.

Figure 3:
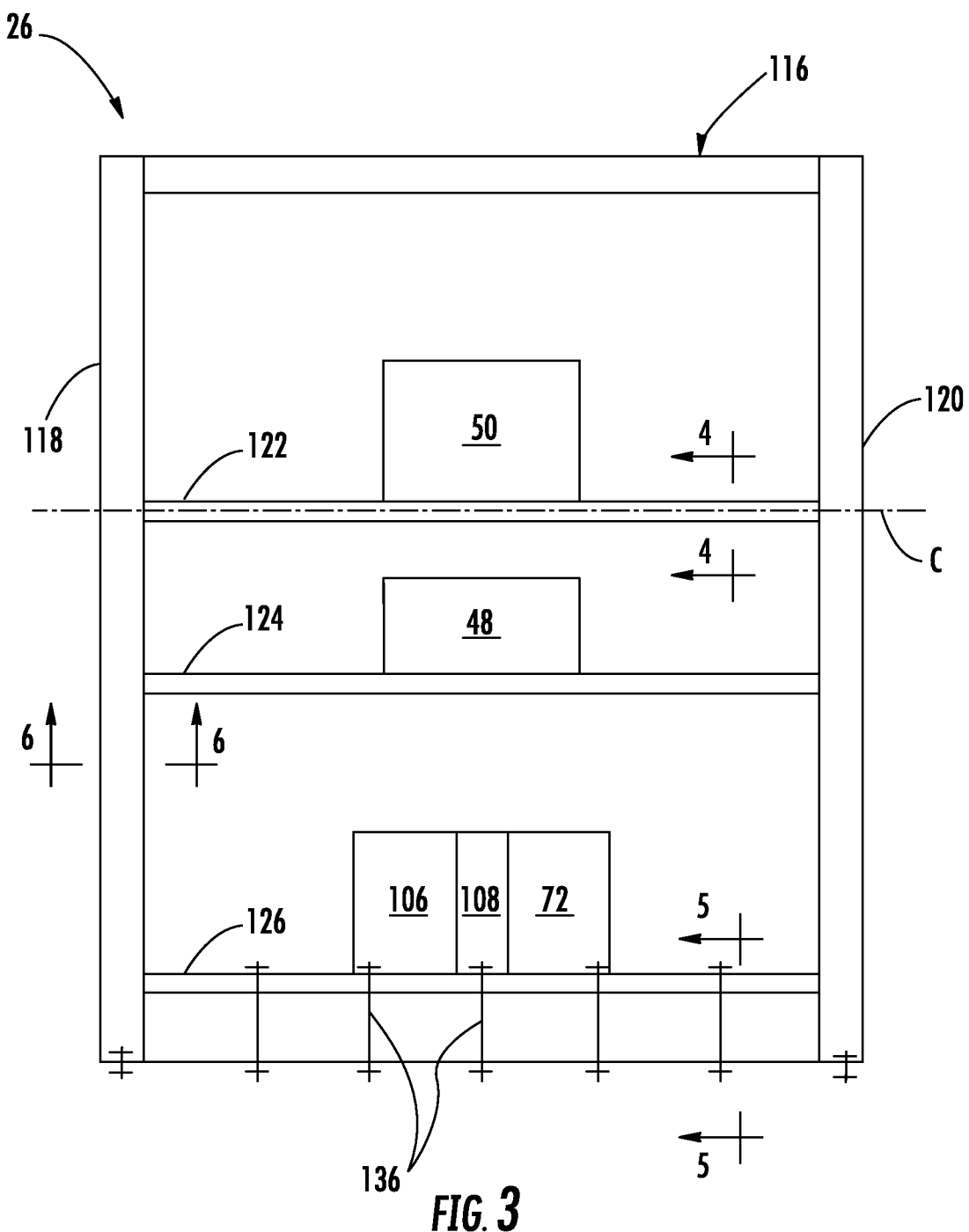
FIG. 3 is a schematic of the transport refrigeration unit with portion removed to illustrate a frame.

Referring to FIG. 3, the TRU 26 may further include a structural frame 116 that may include a plurality of members 118, 120, 122, 124, 126. Members 118, 120 may be elongated, may be tubular or hollow, and may extend substantially vertically. Members 122, 124 may be elongated, may be tubular or hollow, and may extend substantially horizontally connecting to the vertical members 118, 120 at respective opposite ends. In one embodiment, the hollow members 118, 120, 122, 124 may each define respective cavities 128 (see FIG. 4) that are in communication with one another. For example, the ends of the horizontal member 122 may generally be open and communicates with the cavity 128 of the vertical member 118 via an opening, or port, in the vertical member wall. It is contemplated and understood that the frame 116 may include any number of structural members configured in any variety of orientations or lattices. It is further understood that any one, or more, of the structural members may be a tube having any variety of cross sectional shapes.

In one, non-limiting, embodiment, the horizontal member 124 may be vertically spaced between the horizontal members 122, 126. The horizontal member 122 may structurally support, and is adjacent to, the evaporator assembly 50. The horizontal member 124 may structurally support, and is adjacent to, the condenser assembly 48. The horizontal member 126 may structurally support, and is adjacent to, the compressor assembly 72, the generator 108, and the combustion engine 106.

Figure 4:
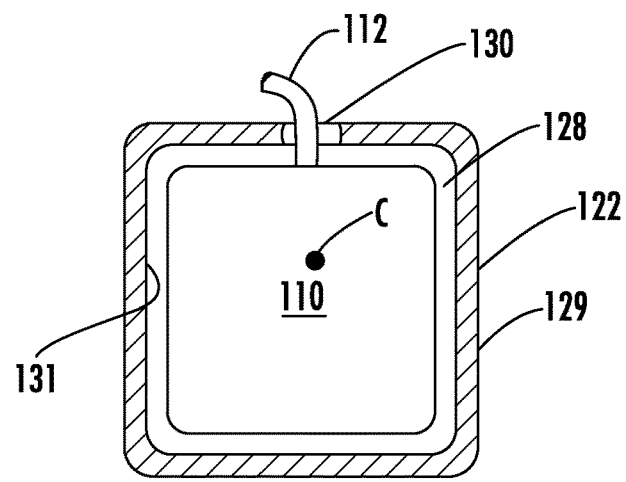
FIG. 4 is a cross section of a horizontal member of the frame containing at least a portion of an energy storage module of the transport refrigeration unit, and take along line 4-4 of FIG. 3.

Referring to FIG. 4, the horizontal member 122 may be an elongated tube extending along a centerline C. The tube 122 may carry an outer surface 129 that is circumferentially continuous and faces radially outward, and an opposite inner surface 131 that faces radially inward and generally defines the boundaries of the cavity 128. At least a portion of the energy storage module 110 may be located in the cavity 128 of the horizontal member 122. The member 122 may include an opening or port 130 defined by the wall of the member for routing of the power conductors 112 to the adjacent evaporator assembly 50. The portion of the energy storage module 110 (i.e., a number of batteries) located in the member 122 may be dedicated toward providing power to the evaporator assembly 50 and may be sized to meet a given operating scenario. Although not illustrated, the opposite ends of the horizontal member 122 may be flanged, and the flanges may be detachably engaged to the respective vertical members 118, 120. It is contemplated and understood that the member 124 may contain a portion of the energy storage module 110 to power the condenser assembly 58. Moreover, it is understood that any of the hollow members may contain any number of batteries of the energy storage module 110.

Figure 5:
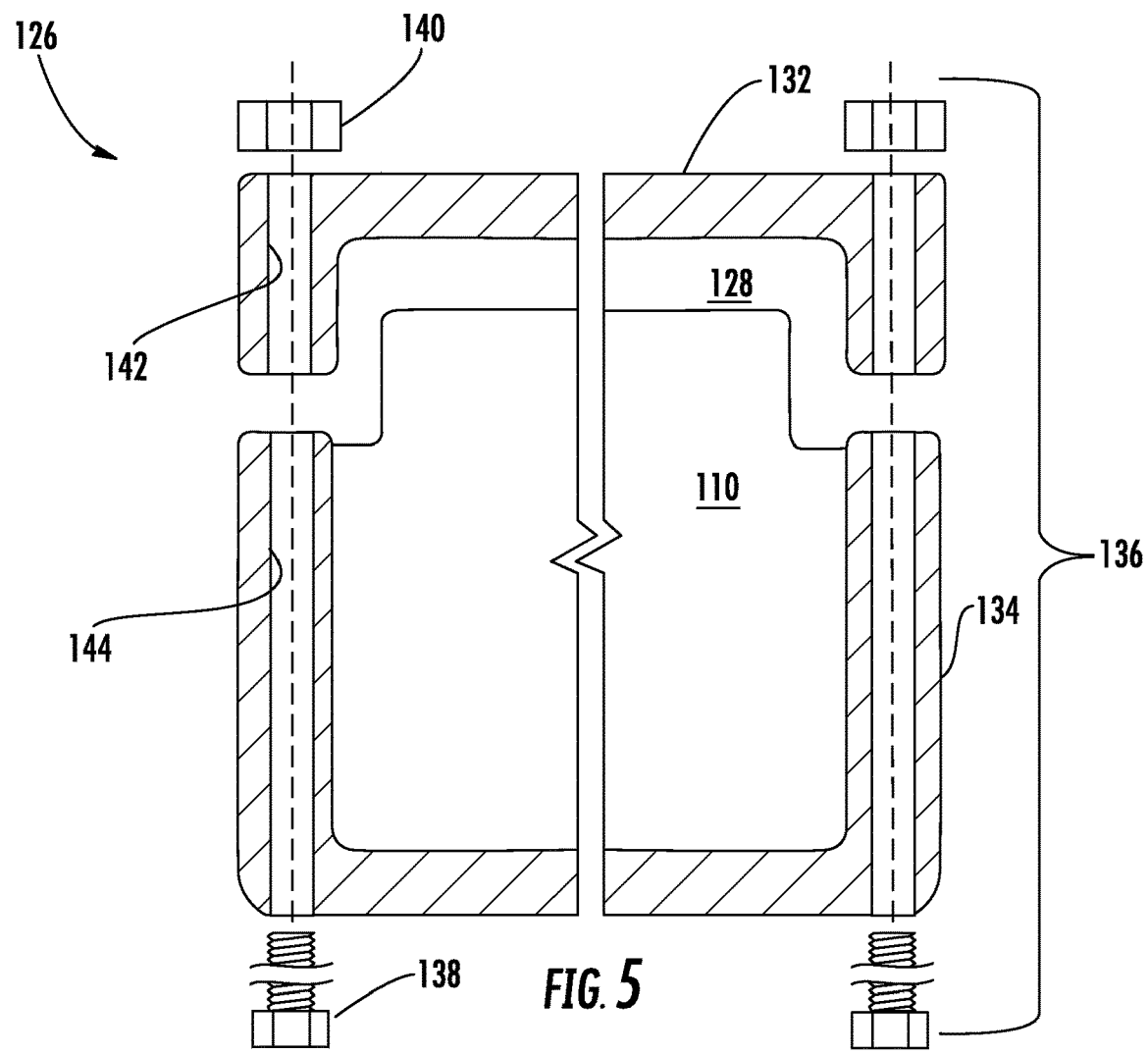
FIG. 5 is a cross section of a compound horizontal member of the frame containing another portion of the energy storage module, and taken along line 5-5 of FIG. 3.

Referring to FIG. 5, the horizontal member 126 may generally be a compound member including a top tray or cover 132 and a bottom tray or cover 134. The top tray 132 may be a plate, or may be generally inverted, and may be fixed to the vertical members 118, 120. In one example, the compressor assembly 72, the combustion engine 106, and the generator 108 may be directly attached to the top tray 132 from above.

The bottom tray 134 may support, or may be an integral part of, an encasement of the energy storage module 110. Together, the trays 132, 134 provide the needed structural integrity to support the weight of the compressor assembly 72, the combustion engine 106, the generator 108, and the batteries 110 during normal operation. For maintenance purposes, the lower tray 134 may be detachable from both the vertical members 118, 120 and the upper tray 132. This detachment facilitates the relatively simple removal of the energy storage module 110 from the bottom of the TRU 26.

More specifically, the compound member 126 may include a plurality of fasteners 136 that may extend vertically through the trays 132, 134. Once fastened, the trays 132, 134 from a hollow tubular member having greater structural strength than the trays taken individually. In one example, the fastener 136 may include a threaded bolt 138 and a nut 140. In this embodiment, the bolt 138 may extend through aligned bores 142, 144 in the respective trays 132, 134. It is understood and contemplated that any other member of the frame 116 may be a compound member having a cavity adapted to hold any number of batteries of the energy storage module 110.

Figure 6:
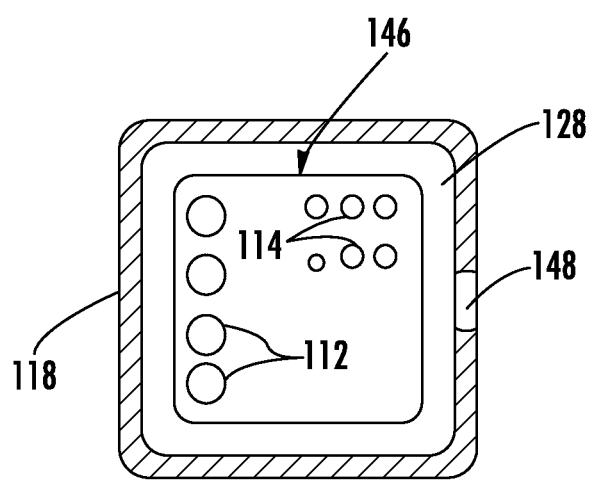
FIG. 6 is a cross section of a vertical member of the frame containing an electrical buss, and taken along line 6-6 of FIG. 3.

Referring to FIG. 6, the cavity 128 defined by the vertical member 118 may contain an electrical bus 146 that may include any one or more of the power and control conductors 112, 114. The bus 146 may be generally routed throughout the cavities of the frame 116, and may project out of the members via a strategically placed opening or port 148, when required, to connect to an adjacent refrigeration component.

Benefits of the present disclosure include compact and efficient packaging of the TRU 26. Other benefits include ease of energy storage module maintenance, and reduced frame weight by utilizing the battery encasement as part of the frame structure.

While the present disclosure is described with reference to the figures, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A transport refrigeration unit for a trailer of a tractor trailer system, the transport refrigeration unit comprising:
at least one refrigeration component driven by electric power;
a frame constructed and arranged to structurally support the at least one refrigeration component;
an energy storage module adapted to provide the electrical power, and internally located and supported by the frame,
wherein the frame is tubular,
wherein the frame includes a first tubular member directly supporting a first refrigeration component of the at least one refrigeration component and a second tubular member directly supporting a second refrigeration component of the at least one refrigeration component, and
wherein the energy storage module includes a first battery located in the first tubular member and configured to drive the first refrigeration component and a second battery located in the second tubular member and configured to drive the second refrigeration component.

2. The transport refrigeration unit set forth in claim 1, further comprising:
an electrical bus electrically connected between the at least one refrigeration component and the energy storage module, wherein the electrical bus is substantially located inside the frame.

3. The transport refrigeration unit set forth in claim 2, wherein the electrical bus includes a plurality of power conductors.

4. The transport refrigeration unit set forth in claim 3, wherein the electrical bus includes a plurality of control conductors.

5. The transport refrigeration unit set forth in claim 1, wherein the energy storage module is at least one battery.

6. The transport refrigeration unit set forth in claim 1, wherein the frame includes a tube extending along a centerline, the tube including an outer surface facing radially outward and an inner surface facing radially inward, and wherein the inner surface defines a cavity and the energy storage module is disposed in the cavity.

7. The transport refrigeration unit set forth in claim 1, wherein the at least one refrigeration component includes a compressor.

8. The transport refrigeration unit set forth in claim 1, wherein the at least one component includes at least one fan motor.

9. The transport refrigeration unit set forth in claim 1, wherein the first refrigeration component is a compressor and the second refrigeration component is a fan motor.

10. The transport refrigeration unit set forth in claim 1 further comprising:
an electrical bus electrically connected between the first and second batteries, and disposed in the frame.

11. The transport refrigeration unit set forth in claim 10, wherein the frame includes a third tubular member, the first, second and third tubular members each defining respective first, second and third cavities, and the third cavity extends between and is in communication with the first and second cavities, and wherein the first battery is located in the first cavity, the second battery is located in the second cavity, and the electrical bus is at least in-part located in the third cavity.

* * * * *